Oct. 20, 1953

C. A. STRAYER ET AL 2,655,904

HYDRAULIC GAIN CONTROL

Filed May 28, 1951

INVENTORS:
CHALMERS A. STRAYER
JOHN R. CLIFTON

By Herbert E. Metcalf
THEIR PATENT ATTORNEY

Oct. 20, 1953

C. A. STRAYER ET AL 2,655,904

HYDRAULIC GAIN CONTROL

Filed May 28, 1951

INVENTORS:
CHALMERS A. STRAYER
JOHN R. CLIFTON

By Herbert E. Metcalf

THEIR PATENT ATTORNEY though it is not intended. A low gain
UNITED STATES PATENT OFFICE 2,655,904

HYDRAULIC GAIN CONTROL

Chalmers A. Strayer, Wilmington, and John R. Clifton, Rolling Hills, Calif., assignors to Northrop Aircraft, Inc., Hawthorne, Calif., a corporation of California Application May 28, 1951, Serial No. 228,716

2 Claims. (Cl. 121—46.5)

The present invention relates to a rate gain control for hydraulic motor systems, and more particularly, to a means for by-passing hydraulic fluid from one side to the other of a piston in a hydraulic motor cylinder to control the rate gain of the motor when under valve control.

In the copending application of Feeney, Serial No. 23,567, filed April 27, 1948, now abandoned, there is shown, described, and claimed a complete hydraulic control system for operating certain attitude control surfaces in aircraft solely by power in response to signals from the pilot. In this type of system each power unit, comprising a piston driven within a cylinder by fluid flow to operate certain attitude control surfaces, is normally actuated by a control valve which is usually integrally connected therewith. The valve preferably employs a grooved spool member which is axially movable, in response to pilot initiated stick movements, to serially cover and uncover a number of discrete openings in a fixed sleeve mounted in a valve housing, to control the rate of flow into and out of the cylinder; the flow increasing and decreasing at predetermined rates as the valve spool is moved away from the neutral position thereof. As rate of fluid flow into and out of the cylinder determines piston velocity, the term "gain" as used herein is defined as meaning the ratio of valve displacement to rate of flow to the cylinder or its equivalent, piston velocity.

The valve is constructed to allow a controlled and balanced leakage through the sleeve openings into both sides of the motor cylinder piston, and controlled leakage from both sides of the piston to the return line, when the spool is in neutral position. To produce this neutral leakage, certain of the sleeve openings are located with respect to the spool so as to never be completely covered by the spool when the spool is in neutral position. This neutral leakage results in equal pressure drops into and out of the cylinder so that balancing pressures are continuously maintained in the cylinder at neutral, virtually locking the control surface solidly in place against shock loads when the aircraft is in normal flight.

It has been found, in the practical operation of high speed airplanes in particular, that near the neutral position of the valve, the gain should be very low, and that at full open position of the valve, the gain should be very high so that minute control stick movements by the pilot do not cause a fast responsive action of the surface but that large stick movements will do so. Fast action near the neutral position at a high rate of speed could cause the airplane to climb steeply or dive when it is not so intended. A low gain near neutral, therefore, essentially reduces control stick sensitivity under normal flight conditions.

Practical fabrication considerations prevent the size of the flow holes carrying the fluid at or near neutral from being made sufficiently small for example, to provide a near neutral gain in high speed airplanes that is low enough to provide a desired low stick sensitivity. For example in a 3000 p. s. i. system, with first flow holes being half covered at neutral to provide 1500 p. s. i. on each side of the piston, the practical diameter of these first holes cannot be reduced much below .015 inch when the full valve spool travel in one direction is only about .125 inch under the control of the pilot.

Consequently, in order to reduce gain near neutral, rather than reduce the size of the first flow holes we have found it more practical to by-pass a controlled amount of fluid from one side of the piston to the other. The amount of fluid so by-passed can readily be adjusted to satisfactorily reduce gain over the range of the valve spool traversing the first flow holes; this amount of by-pass however having very little effect on the gain of the valve as additional flow holes are uncovered to obtain the maximum gain in the system.

It is therefore an object of the invention to provide a simple means of controlling the gain of a hydraulic system having a motor controlled by a valve.

It is also an object of the invention to provide a means for controlling the gain of a valve apart from the structure of the valve itself.

And it is a still further object of the invention to provide a means for producing a very low gain near the neutral position of a hydraulic valve controlling a hydraulic motor, without resorting to extremely fine mechanical tolerances in the valve itself.

Briefly, in one preferred apparatus form, the by-pass of the present invention comprises means forming a by-pass channel which connects the two sides of the piston in the cylinder of a hydraulic motor and servo valve assembly. A plug is provided in the by-pass channel, and this plug has a small orifice therein to restrict the fluid flow through the channel. System parameters determine the size of the orifice to obtain the best results therefrom. A filter is preferably installed on each side of the plug to prevent possible jamming of the by-pass orifice by extraneous particles in the fluid.

As the present invention is peculiarly adapted for use in the control system of high speed aircraft, the present invention will be more clearly understood by reference to the specification drawings wherein.

Figure 1:
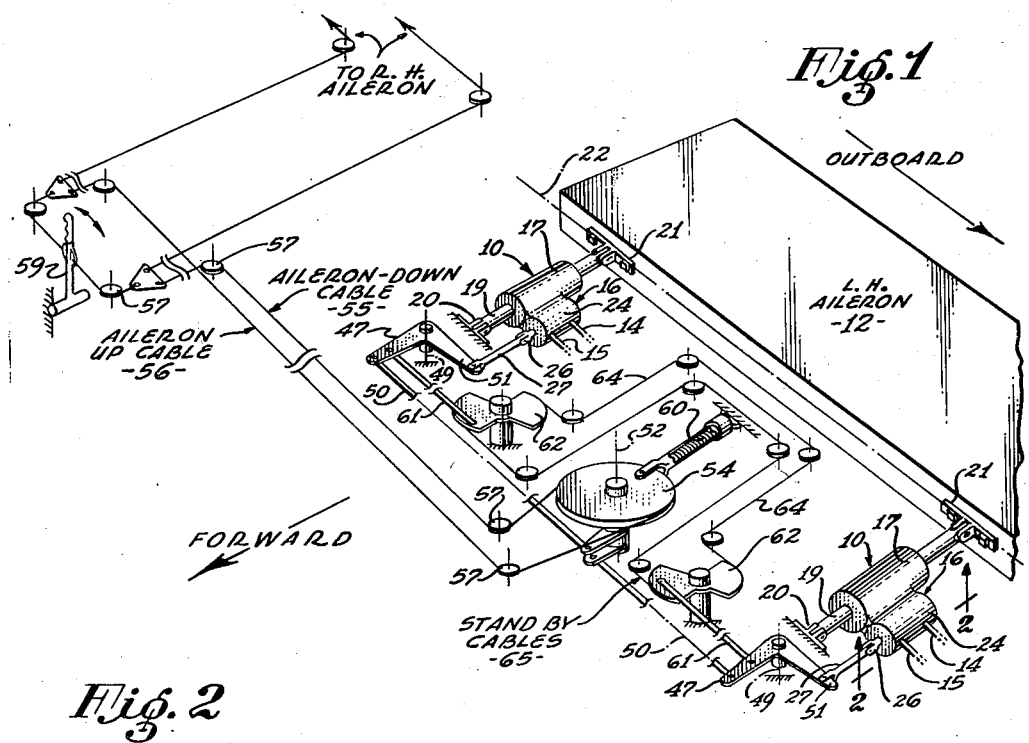
Figure 1 is a somewhat diagrammatic view in perspective of a portion of an aircraft full power control system of the Feeney type referred to above.

A portion of one form of a full power control system useful for airplanes in the 600+ M. P. H. class is shown in Figure 1, where a pair of aileron power units 10 are operatively connected to move an aileron 12 which is normally located in the wing panel of an aircraft (not shown). A hydraulic pressure line 14 and return line 15 connect into a servo control valve 16 connected to each outboard power unit 10. These power units will be described in detail later in the description.

Each aileron power unit 10 is composed of an actuating cylinder assembly 17 having its piston rod 19 projecting forwardly and pivotally secured to structural fittings 20 attached in the wing panel (not shown). The closed end of each cylinder 10 connects directly to an aileron pivot fitting 21 above an aileron hinge line 22.

Figure 2:
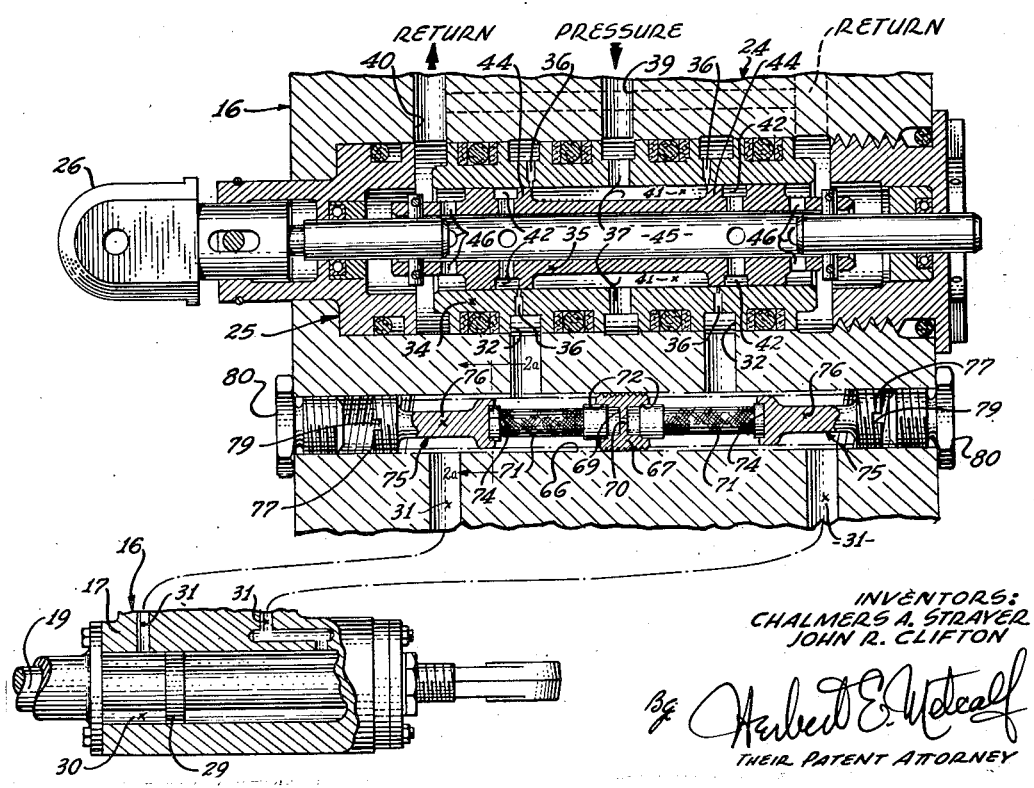
Figure 2 is a longitudinal sectional view of the servo control valve used in the system shown in Figure 1.

A valve housing 24 is connected with the actuating cylinder 17, or is made an integral part thereof as in the present case, and encloses a valve assembly 25 which is best shown in Figure 2. The clevis 26 end of the valve assembly 25 protrudes to connect to a valve operating rod 27 as shown in Figure 1.

Referring again to Figure 2, in the actuating cylinder 17 the piston rod 19 carries a piston 29 operating in a cylinder chamber 30 having cylinder supply passages 31 at each end thereof. Cylinder supply passages 31 lead to outer fluid grooves 32 or the valve assembly 25 which comprises a fixed sleeve 34 and a valve spool 35 slidable within the sleeve 34. Each outer fluid groove 32 connects with the interior of the sleeve 34 by means of radially drilled fluid flow openings 36 which are located in a staggered pattern lengthwise of the sleeve 34. A ring of pressure ports 37 through the approximate center of the sleeve 34 communicate with a pressure inlet bore 39 in the valve housing 24 which connects to one of the pressure fluid lines (not shown). Opposite one end of the sleeve 34, a return bore 40 also communicates with the sleeve 34 interior and with a return line (not shown).

The valve spool 35 contains a peripheral pressure groove 41 opposite the sleeve pressure ports 37, with a return groove 42 on each side of the pressure groove 41. Metering lands 44 separating the spool grooves 42 and 41, are located opposite the respective sets of sleeve fluid flow openings 36 when the spool 35 is in neutral position, and the spool return grooves 42 connect with an axial spool bore 45 communicating with radial spool end passages 46 by which return fluid reaches the housing return bore 40.

Thus movement in either direction of the spool 35 away from neutral position causes fluid flow openings 36 to be uncovered to connect one side of the actuating cylinder piston 29 to pressure, through one of the cylinder supply passages 31, and to connect the other side of the piston 29 to return.

The metering lands 44 and openings 36 are spaced and constructed to allow a controlled balanced leakage through the openings 36 into both sides of the actuator piston 29 and controlled balanced leakage from both sides of the piston 29 to the return bore 40 when the valve is in neutral position.

The valve is not, per se, a claimable part of the present invention as it forms the subject of a copending application Serial Number 123,375, filed October 25, 1949, by Strayer, now Patent No. 2,612,872.

Referring again to Figure 1, each valve operating rod 27 is pivotally connected to a bell crank 47 which is rotatable about a fixed axis 49 and a solid linkage 50 connects each bell crank 47 to a common bell crank arm 51 rotatable about a quadrant axis 52. A cable control quadrant 54, fixed to rotate with the crank arm 51, carries an aileron down cable 55 and an aileron up cable 56 on the opposite sides thereof; these cables passing over pulleys 57 and coming from a pilot's control stick 59 in the conventional manner. A centering spring 60 assembly connected from a point on the control quadrant 54 to the wing structure (not shown) provides control stick 59 centering forces.

Also pivotally connected to each bell crank 47 to move in the same direction is a push-pull rod 61 similarly connected to one of two synchronizing quadrants 62 connected to rotate together by closed circuit synchronizing cables 64, so that when the aileron control cables 55 and 56 move the linkages 50 and the bell cranks 47, the standby cables 64 are constrained to follow this movement.

Figure 2A:
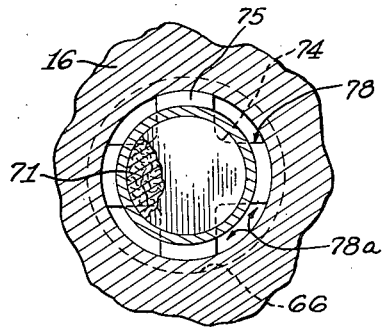
Figure 2a is an enlarged cross-sectional view taken on line 2a—2a of Figure 2.

In order that the gain of the system near neutral may be reduced without reducing the size of metering holes 36, we provide a by-pass assembly, which in one preferred embodiment as shown in Figure 2, takes the form of a threaded bore passage 66 which is, as shown, threaded throughout the entire length thereof extends axially through the valve housing 24 and intersects both of the cylinder supply passages 31. An annular threaded plug 67 is positioned in the threaded bore passage 66 intermediate the cylinder supply passages 31. The plug 67 is bored out on both sides thereof, leaving a partition 69 centered approximately between the two ends thereof. An orifice 70 is drilled through the partition 69 axially of the plug 67. A cartridge type filter 71 is provided on each side of the plug 67, being positioned within each plug end to bear against an annular shoulder 72 which is concentrically counterbored on each side therein. The other end of each filter 71 is retained within an annular recess 74 in the end of a filter retainer 75, which is positioned in the threaded bore passage 66 at the outer end of each filter 71. The recessed end 74 of the filter retainer 75 is given an outside diameter slightly smaller than the minor diameter of the threaded bore passage 66 to provide clearance therefor, and is preferably made as best shown in Figure 2a. Four diametrically opposed portions are longitudinally cut away from the outer periphery of the recessed end 74 and terminate near the shank 76 of the retainer 75 to define four distinct claw members 78 within which the filter 71 end is retained. The cutaway portions thereby define four diametrically opposed longitudinal channels 78a through which fluid passes from sleeve grooves 32 through supply passages 31 to the power unit cylinder 17. It can thus be seen that only the fluid passing in either direction through the by-pass orifice 70 in plug 67 is filtered. In this manner then, any foreign particles which might be present in the fluid are prevented from clogging the minute by-pass orifice 70. Each filter retainer 75 is provided with an externally threaded barrel 77 of the same thread size as the internal thread of the threaded bore passage 66. A transverse slot 79 is preferably provided in the end of the threaded barrel 77 to accommodate a screw driver so that the retainers can be easily inserted or removed thereby.

Fluid passing through the valve 16 is directed through the fluid grooves 32, into the supply passages 31, passing through the filter 71 on each side of the plug 67 in the bore passage 66, through the channels 78a through the end of the filter retainers 76, and into the actuating cylinder 17. Fluid is returned from the cylinder 17 through supply passages 31, to the sleeve grooves 32, through the sleeve openings 36 into the spool grooves 42 and entering the spool bore 45, then passing through the end passages 46 to the housing return port 40.

The ends of the threaded bore passage 66 are preferably enclosed by means of plugs 80 as shown for example.

In operation, when a small differential pressure occurs on either side of the piston 29 in the motor cylinder 17 fluid from one side or the other of the piston 29 passes through the orifice 70 in the plug 67 reducing gain thereby. The diameter of the orifice 70 is generally governed by system parameters in order to achieve the best results therefrom.

Figure 3:
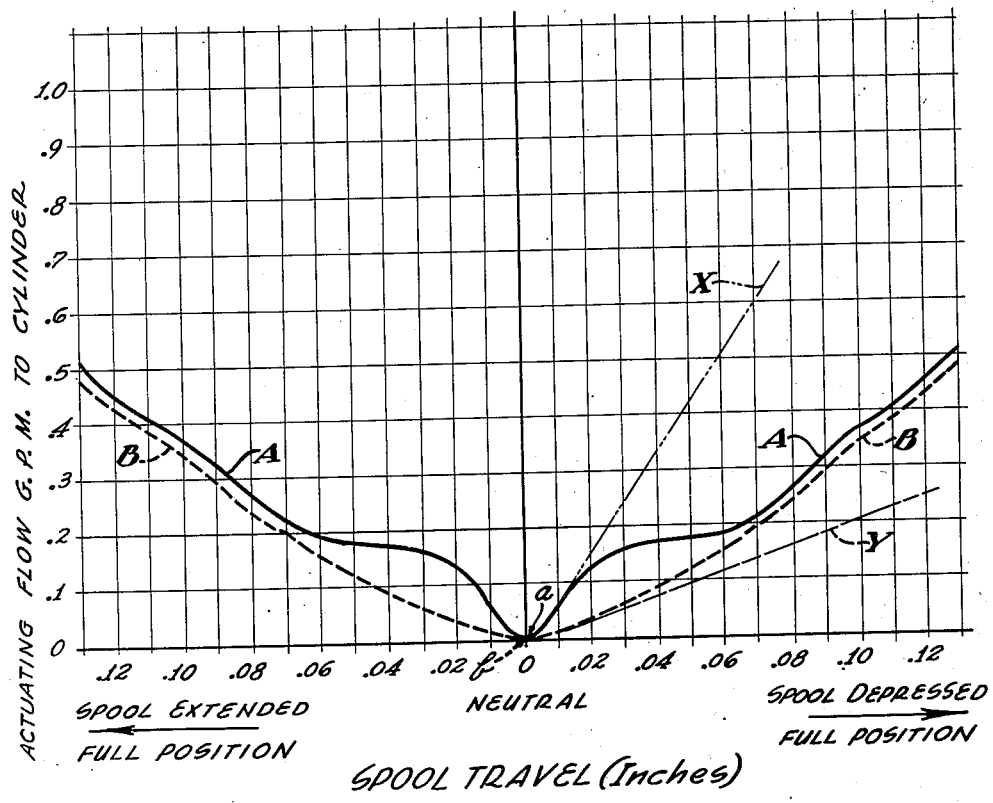
Figure 3 is a coordinate diagram showing flow in gallons per minute as plotted against spool travel away from neutral, in the valve shown in Figure 2.

In Figure 3, a coordinate chart is shown wherein curve A expresses the present rate gain in one particular system as the valve is moved away from the neutral position, indicated by $a$, to produce flow to the cylinder. As the spool is moved so that the openings are completely open, with the opposite openings completely closed in both pressure and return channels, the flow rate to the cylinder rises to about .13 g. p. m. with a spool travel of only about .015 inch. The effect of uncovering additional flow openings just beyond the first flow opening is hardly discernable in curve A. Dotted line X shows the steepness of the flow rate curve during the uncovering of the system and indicates a high gain during the stick movement accomplishing full opening of the first flow opening.

The effect of the present invention on the flow rate curve of the same valve is clearly shown in curve B of Figure 3.

Curve B shows that as the stick is moved away from neutral, indicated by $b_1$ to uncover the first flow hole, the slope of the flow rate curve B is greatly reduced as indicated by the dotted line $y$. However, after the first hole has been opened, it will be noted that the slope of the two curves A and B are substantially the same as the valve is moved to full position. It is also to be noted that by the use of the by-pass orifice 70 the flow curve B more nearly approaches a straight line.

The reduction in steepness of the flow curve B near neutral as shown by comparison of the slopes of dotted lines X and $y$ greatly reduces stick sensitivity near neutral. The objects of the invention have therefore been obtained without change in the valve structure itself.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. In a hydraulic system having a piston movable within a cylinder in accordance with fluid flow controlled by a valve, said valve providing a balanced neutral leakage to both sides of said piston at the neutral position of said valve, said valve providing a rate gain in said system increasing in a predetermined manner when said valve is moved in either direction away from said neutral position by serially uncovering a number of fluid flow openings, the first of said flow openings being bisected to produce said neutral flow when said valve is in said neutral position, means forming a by-pass channel connecting the two sides of said piston, and means forming an orifice being provided in said channel to control the flow of fluid therethrough, the diameter of said orifice being on the order of the diameter of said neutral flow openings.

2. In a hydraulic system having a piston movable within a cylinder in accordance with fluid flow controlled by a valve, said valve providing a balanced neutral leakage to both sides of said piston at the neutral position of said valve, said valve providing a rate gain in said system increasing in a predetermined manner when said valve is moved in either direction away from said neutral position, means for reducing said gain in said system near said neutral position of said valve, which comprises means forming a by-pass channel connecting one side of said piston with the other side thereof, a plug in said channel, said plug having an orifice therein to restrict fluid flow through said channel, said orifice being sized large enough to reduce gain in said system when said valve is near said neutral position, said orifice being sized small enough so that the normal gain of said system near full position is not substantially impaired, and means for filtering the fluid flowing through said channel.

CHALMERS A. STRAYER.
JOHN R. CLIFTON.

References Cited in the file of this patent

UNITED STATES PATENTS

| Number | Name | Date |
|---|---|---|
| 1,876,104 | Tucker | Sept. 6, 1932 |
| 2,372,710 | Chisholm | Apr. 3, 1945 |